April 10, 1962     G. H. WILSON     3,029,347

DETECTION OF SUDDEN SPEED CHANGES

Filed March 9, 1959

*Inventor*
*George Herbert Wilson*
By his attorneys

Howson and Howson

United States Patent Office 3,029,347
Patented Apr. 10, 1962

3,029,347
DETECTION OF SUDDEN SPEED CHANGES
George Herbert Wilson, Coventry, England, assignor to Courtaulds Limited, London, England, a British company
Filed Mar. 9, 1959, Ser. No. 798,268
Claims priority, application Great Britain Mar. 20, 1958
6 Claims. (Cl. 250—219)

This invention is concerned with mechanism for detecting a change in velocity of a moving member, such as occurs in certain types of textile yarn testing machines when yarn breaks under tension. Machines of this type operate by submitting a sample of yarn to a gradually increasing load between clamps which move apart as the sample stretches. Generally one clamp is more or less stationary and the other moves steadily, but not necessarily uniformly, under the load until the moment of break, when the second clamp suddenly runs away as the restraint of the yarn is removed.

The present invention provides a mechanism whereby a change of velocity beyond a predetermined velocity, on the part of a moving member such as the above-mentioned moving clamp, can be detected.

According to the present invention, the mechanism comprises a follow-up member, a slipping drive adapted to drive said follow-up member behind the moving member at a velocity which, when the drive is not slipping, equals said predetermined velocity and a detector adapted to operate only when said moving and follow-up members are not in, or are no longer in, adjacent positions. Thus, if the moving member moves at less than the predetermined velocity, the follow-up member is held back against its drive, which slips as a result. As soon as the moving member moves at a velocity greater than the predetermined velocity, it leaves the follow-up member behind, since the latter moves at said predetermined velocity, and the detector is able to operate.

According to the present invention a follow-up member is driven behind the moving member via a slipping drive which, when not slipping, drives the follow-up member at the predetermined velocity and providing a detector which will operate only when the moving and follow-up members are not adjacently positioned.

The detector may be a photoelectric cell and an associated light source and a portion of the follow-up member may then be capable of insertion between the cell and the light source.

The follow-up member may be driven via a friction drive, so that slip of the drive against the frictional effect is possible.

For example, a photoelectric cell may be carried by the movable clamp of a textile yarn testing machine and the follow-up member may be mounted upon a cable or belt and lie between the cell and a source of light when said member and clamp are in adjacent positions. The photoelectric cell and light source may be interchanged as desired. The cable or belt is driven at the predetermined velocity and the drive is such that the follow-up member is made to slip back relative to the cable or belt by the clamp when the latter moves at a lesser velocity than the predetermined velocity.

The invention will now be further described by reference to the accompanying drawing, which illustrates a typical mechanism according to the present invention.

Figure 1:
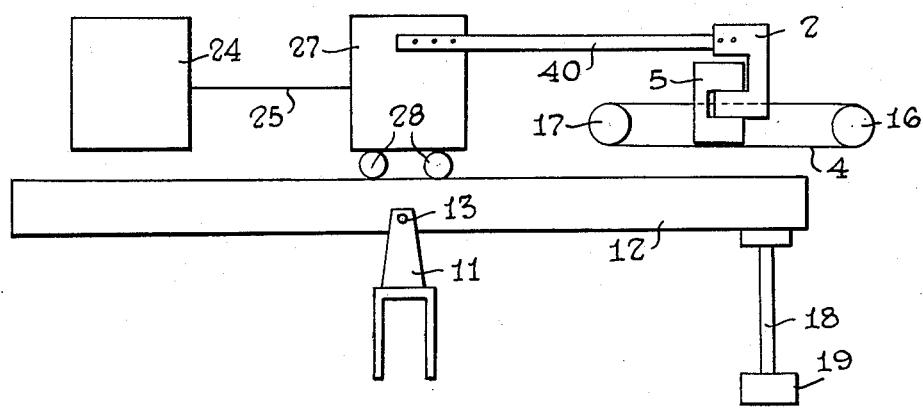
FIG. 1 is a diagrammatic view of one apparatus to which the invention has been applied.
Figure 2:
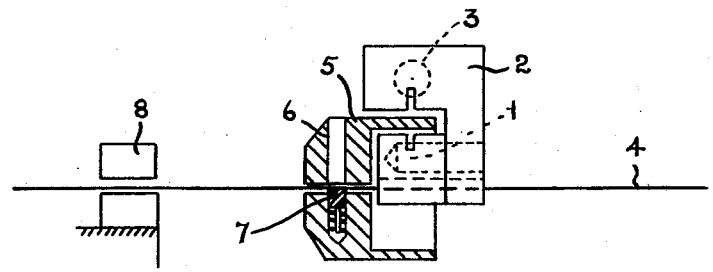
FIG. 2 is a detail view diagrammatically illustrating the invention.

A bracket 2 mounted upon the movable clamp of a yarn testing machine, a typical machine being disclosed in United States Patent to Scott 2,442,150 issued May 25, 1948, carries a photoelectric cell 3 and a lamp 1 for exciting the cell 3. The bracket, during a given test, moves from left to right, as diagrammatically shown in FIG. 1 wherein yarn 25 to be tested is clamped at one end to a fixed clamp member 24 and at its other end to a movable carriage member 27 on wheels 28. The bracket 2 may be connected by a bar 40 to the carriage 27. The movable carriage runs down the beam 12 which is tiltable by a bar 18 as the latter is pulled down by mechanism 19, all as more fully described in said Scott patent.

A flexible wire cable 4 is also driven from left to right around pulleys 16 and 17 during a test, at a predetermined speed which is greater than that of the bracket and clamp up to the moment of break. A cup-shaped shroud 5 is threaded on the cable 4 and has a transverse bore 6 which accommodates a spring-loaded friction pad 7. The pad 7 is held by the spring against the cable 4.

Initially, the cable 4 moves more rapidly than the bracket 2, so that the shroud 5 is held up against the bracket and slips back relative to the cable. When the yarn breaks, the bracket rapidly accelerates and its speed soon exceeds that of the cable 4. The shroud is now free to move with the cable, while the bracket moves away from the shroud and so allows light from the lamp 1 to fall upon the cell 3.

The exciting of the cell 3 is thus an indication of break of the yarn under test. The current generated in the cell may be used to operate a signal and/or a recording mechanism.

If a stationary stop 8 is situated against the initial position of the shroud 5, the cable 4, in returning after the test to its original position, will carry the shroud 5 against the stop 8. The latter will hold the shroud against further movement with the cable, so that the shroud 5 and cable 4 will resume their original relative positions.

It will be seen that although the movable clamp moves at varying velocity as the thread stretches, applicant's apparatus ignores these variations when recording the moment of break of the thread.

By reversing the relative positions of the moving member and the follow-up member, in other words by driving the follow-up member ahead of the moving member, it is possible to adapt the mechanism of the present invention to detect reductions in velocity beyond a predetermined velocity.

What I claim is:

1. In a strand testing machine having a member movable to apply stress to a strand to be tested, and means for moving the member, the mechanism for detecting a change in velocity of said movable member beyond a predetermined velocity, comprising a second member mounted so as to be incapable of passing said movable member, an indicator for indicating when the second member and movable member are in adjacent positions, and a slipping drive for said second member which in the absence of slipping, drives said second member at the predetermined velocity.

2. In a strand testing machine having a member movable to apply stress to a strand to be tested, and means for moving the member, the mechanism for detecting a change in velocity of said movable member beyond a predetermined velocity, comprising a second member mounted so as to be incapable of passing said movable member, an indicator for indicating when the second member and movable member are in non-adjacent positions, and a slipping drive for said second member which in the absence of slipping, drives said second member at the predetermined velocity.

3. In a strand testing machine having a member movable to apply stress to a strand to be tested, and means for moving the member, the mechanism for detecting a change in velocity of said movable member beyond a predetermined velocity, comprising a second member mounted so as to be incapable of passing said movable member, an indicator for indicating when the second member and movable member move apart, and a slipping drive for said second member which in the absence of slipping, drives said second member at the predetermined velocity.

4. In a strand testing machine having a member movable to apply stress to a strand to be tested, and means for moving the member, the mechanism for detecting a change in velocity of said movable member beyond a predetermined velocity, comprising a second member mounted ot move in the path of the movable member, a source of light and a photoelectric cell which are placed out of communication with each other by the second member when the movable member and the second member are in adjacent positions, and a slipping drive for said second member which, in the absence of slipping, drives said second member at said predetermined speed.

5. In a strand testing machine having a member movable to apply stress to a strand to be tested, and means for moving the member, the mechanism for detecting a change in velocity of said movable member beyond a predetermined velocity, comprising a lamp and a photoelectric cell, both associated with the movable member, a second member mounted to move in the path of the movable member and to break commununication between the lamp and the cell when said movable member and said second member are in adjacent positions, and a slipping drive for said second member which, in the absence of slipping, drives said second member at said predetermined speed.

6. In a strand testing machine having a member movable to apply stress to a strand to be tested, and means for moving the member, the mechanism according to claim 5, in which said slipping drive comprises a cable upon which the second member is mounted and is driven thereby in the absence of slipping by friction.

References Cited in the file of this patent

UNITED STATES PATENTS

| | | |
|---|---|---|
| 1,895,924 | Hammond | Jan. 31, 1933 |
| 1,895,925 | Hammond | Jan. 31, 1933 |
| 2,389,625 | Lambach et al. | Nov. 27, 1945 |
| 2,608,846 | Seibert | Sept. 2, 1952 |
| 2,636,223 | De Santis et al. | Apr. 28, 1953 |
| 2,895,373 | Eyraud | July 21, 1959 |